United States Patent
Woo et al.

(10) Patent No.: US 12,269,486 B2
(45) Date of Patent: Apr. 8, 2025

(54) METHOD OF IMPLEMENTING A PREPARATION MODE FOR CIRCUIT DRIVING OF A VEHICLE

(71) Applicants: HYUNDAI MOTOR COMPANY, Seoul (KR); KIA CORPORATION, Seoul (KR)

(72) Inventors: Dong Hyeon Woo, Daegu (KR); Ho Kyun Chun, Seoul (KR); Jin Kyeom Cho, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 161 days.

(21) Appl. No.: 18/195,513

(22) Filed: May 10, 2023

(65) Prior Publication Data
US 2024/0270258 A1  Aug. 15, 2024

(30) Foreign Application Priority Data
Feb. 10, 2023 (KR) .......... 10-2023-0017806

(51) Int. Cl.
*B60W 40/105* (2012.01)
(52) U.S. Cl.
CPC ... *B60W 40/105* (2013.01); *B60W 2510/0676* (2013.01); *B60W 2510/18* (2013.01); *B60W 2520/26* (2013.01)
(58) Field of Classification Search
CPC ....... B60W 40/105; B60W 2510/0676; B60W 2510/18; B60W 2520/26; B60W 30/18172; B60W 50/00; B60W 30/18; B60W 40/12; B60W 10/18; B60W 10/30; B60W 2520/10; B60W 2520/28; B60W 2556/45; B60W 2710/088; B60L 58/27; B60L 50/60; B60T 17/18; F02N 19/10; F16H 57/0412; G01S 19/42; B60Y 2200/91; Y02T 10/70
See application file for complete search history.

(56) References Cited

FOREIGN PATENT DOCUMENTS

KR      20160037816 A      4/2016

*Primary Examiner* — Jacob M Amick
*Assistant Examiner* — Charles J Brauch
(74) *Attorney, Agent, or Firm* — Lempia Summerfield Katz LLC (57) ABSTRACT

A method of implementing a preparation mode capable of improving driving performance of a vehicle by warming up a vehicle component before racing is provided. The method includes acquiring vehicle state information detected by a vehicle state detector while the vehicle is driven on a circuit before racing after entering the circuit, and determining a tire slip rate from a wheel speed and a vehicle speed in the vehicle state information. The method also includes determining whether a current vehicle driving state satisfies a preset preparation mode entry condition based on the vehicle state information and the tire slip rate. The method further includes, when the current vehicle driving state satisfies the preset preparation mode entry condition, controlling an operation of a warm-up device for warming up a vehicle component that determines driving performance of the vehicle, and warming up the vehicle component.

17 Claims, 3 Drawing Sheets

Finish line

BRAKING SECTION OF CIRCUIT

FIG. 4

METHOD OF IMPLEMENTING A PREPARATION MODE FOR CIRCUIT DRIVING OF A VEHICLE

CROSS-REFERENCE TO RELATED APPLICATION

This application claims the benefit of and priority to Korean Patent Application No. 10-2023-0017806, filed on Feb. 10, 2023, the entire contents of which are incorporated herein by reference.

TECHNICAL FIELD

The present disclosure relates to a method of implementing a preparation mode of a vehicle for racing.

BACKGROUND

Traditionally, speed competition with others using vehicles has been performed through vehicle racing. In conventional vehicle racing, several vehicles driven by professional racers compete for speed on a racetrack.

There has been little opportunity for ordinary drivers to race vehicles on race tracks. Only professional racers choosing racing as a profession have mostly been able to participate in vehicle racing. Ordinary people have indirectly satisfied their desire for speed competition and racing by watching vehicle races on race tracks.

General drivers may arbitrarily conduct vehicle races on public roads. However, vehicle racing on general roads is generally legally prohibited because the risk of accidents is significantly high. Also, when vehicle racing is conducted on general roads, there are legal problems such as speeding.

However, it is a reality that the desire for speed competition and racing is further increasing for general drivers as the base of motor sports has recently expanded and vehicle performance has gradually improved.

Accordingly, each vehicle manufacturer holds various events such as complex cultural content events on a circuit, such as a racing road, to provide opportunities for the general public to experience racing (vehicle racing) on the circuit.

Moreover, recently, circuits where general drivers may experience racing have been built and constructed all over the country. Many circuits currently built in various places across the country may be used by ordinary drivers through simple procedures.

A driver using a circuit may check a lap time of the driver on the circuit and may compare the lap time with a lap time of another party or a lap time of another driver using the circuit. In this way, it is possible to enjoy the pleasure of high-speed driving, and to enjoy the fun of comparing driving skills with others.

As the interest in circuit driving and experience and the desire for speed competition have gradually been growing, more drivers desire to improve understanding of vehicles and circuits and enjoy fun driving in environments different from daily driving conditions using vehicles of the drivers.

Some systems have been implemented to perform a circuit mode of a vehicle considering these points so that a general driver may use a vehicle of the driver to perform circuit driving and gain circuit experience more conveniently and satisfy the desire for speed competition and fun driving. Marketability of a vehicle equipped with such system may be improved.

During circuit driving, it is necessary to measure a lap time by making best vehicle performance within a limited use time. In order to renew the best lap time, warm-up and proper maintenance of vehicle components are required prior to time measurement.

For example, components (suspension, engine, motor, transmission, battery, etc.), such as powertrain components, need to be warmed up before racing. Further, a tire condition in which adhesion to the ground is increased is required.

However, a time required to warm up vehicle components, i.e., parts or devices included in the vehicle, to an appropriate state varies depending on the driving environment such as weather or humidity and the driving habits of the driver.

For example, a warm-up time may be increased when smooth driving is desired in cold or wet weather. On the other hand, a warm-up time may be decreased when extreme driving is desired in hot or dry weather.

In addition, considering that a use time of the circuit is limited, rapid warm-up is required before driving on the circuit. Furthermore, it is necessary for the driver to be provided with and notified of information related to warm-up of the vehicle.

Currently, development and research of circuit experience-related technologies for the general public have been conducted only for those directly related to driving on the circuit. Until now, technological development and research related to a circuit preparation process, such as warming up of vehicle components required to improve circuit driving performance, have not been conducted.

The above information disclosed in the background section is merely for enhancement of understanding of the background of the disclosure and therefore it may contain information that does not form prior art that is already known to those having ordinary skill in the art.

SUMMARY

The present disclosure has been made in an effort to solve the above-described problems associated with prior art. An objective of the present disclosure is to provide a method of implementing a preparation mode capable of improving circuit driving performance of a vehicle by warming up a vehicle component (vehicle-mounted part or device) before racing.

Objectives of the present disclosure are not limited to the objective mentioned above. Other objectives of the present disclosure, which are not mentioned, are set forth in part in the description which follows and, in part, should be apparent from the description, or may be learned by practice of the presented embodiments of the disclosure.

In an embodiment, a method of implementing a preparation mode for circuit driving of a vehicle includes acquiring, by a controller, vehicle state information detected by a vehicle state detector while the vehicle is driven on a circuit before racing after entering the circuit, and determining a tire slip rate from a wheel speed and a vehicle speed in the vehicle state information. The method also includes determining, by the controller, whether a current vehicle driving state satisfies a preset preparation mode entry condition based on the vehicle state information and the tire slip rate. The method further includes, when the current vehicle driving state satisfies the preset preparation mode entry condition, controlling, by the controller, an operation of a warm-up device for warming up a vehicle component determining driving performance of the vehicle, and warming up the vehicle component.

In an aspect, the method further includes acquiring, by the controller, current vehicle location information from a GPS signal received by a GPS receiver. Determining the tire slip rate may include verifying, by the controller, whether the vehicle is driven in a determined braking section on the circuit based on information about the circuit selected by a driver and the current vehicle location information, and determining a tire slip rate in the determined braking section on the circuit.

In an aspect, the vehicle is an internal combustion engine vehicle, and determining whether the current vehicle driving state satisfies the preset preparation mode entry condition comprises determining whether the current vehicle driving state satisfies the preset preparation mode entry condition using one or both of an engine temperature and a transmission temperature as the vehicle state information.

In an aspect, the preset preparation mode entry condition may include at least one of a first condition that the engine temperature is less than a preset critical engine temperature, a second condition that the transmission temperature is less than a preset critical transmission temperature, or a third condition that the tire slip rate exceeds a preset critical slip rate. Determining whether the current vehicle driving state satisfies the preset preparation mode entry condition comprises determining that the current vehicle driving state satisfies the preset preparation mode entry condition when the at least one of the first condition, the second condition, or the third condition is satisfied.

In an aspect, the vehicle is an internal combustion engine vehicle, the vehicle component may include at least one of an engine, a transmission, or a tire, and the warm-up device may include at least one of a coolant pump configured to circulate engine coolant, an oil pump configured to circulate transmission fluid, or a brake device configured to brake the vehicle.

In an aspect, when a condition that the engine temperature is less than a preset critical engine temperature is satisfied as the preparation mode entry condition, warming up the vehicle component comprises decreasing an operating rate or an operating speed of the coolant pump to warm up the vehicle component.

In an aspect, when a condition that the transmission temperature is less than a preset critical transmission temperature is satisfied as the preparation mode entry condition, warming up the vehicle component comprises decreasing an operating rate or an operating speed of the oil pump to warm up the vehicle component.

In an aspect, when a condition that the tire slip rate exceeds a preset critical slip rate is satisfied as the preparation mode entry condition, warming up the vehicle component comprises increasing brake hydraulic pressure of the brake device to increase tire friction, thereby warming up the vehicle component.

In an aspect, the vehicle is an electrified vehicle, and determining whether the current vehicle state satisfies the preset preparation mode entry condition comprises determining that the current vehicle state satisfies the preset preparation mode condition using one or both of a battery temperature and a motor temperature as the vehicle state information.

In an aspect, the preparation mode entry condition may include at least one of a first condition that the battery temperature is less than a preset critical battery temperature, a second condition that the motor temperature is less than a preset critical motor temperature, or a third condition that the tire slip rate exceeds a preset critical slip rate. Determining whether the current vehicle driving state satisfies the preset preparation mode entry condition may include determining that the current vehicle driving state satisfies the preset preparation mode entry condition when at least one of the first condition, the second condition, or the third condition is satisfied.

In an aspect, the vehicle is an electrified vehicle, the vehicle component may include at least one of a motor for driving the vehicle, a battery for supplying power to the motor, or a tire, and the warm-up device may include at least one of a motor temperature control device capable of increasing a motor temperature, a battery temperature control device capable of increasing a battery temperature, or a brake device for braking the vehicle.

In an aspect, when a condition that the motor temperature is less than a preset critical motor temperature is satisfied as the preparation mode entry condition, warming up the vehicle component comprises controlling an operation of the motor temperature control device so that the motor temperature is increased to warm up the vehicle component.

In an aspect, when a condition that the battery temperature is less than a preset critical battery temperature is satisfied as the preparation mode entry condition, warming up the vehicle component comprises controlling an operation of the battery temperature control device so that the battery temperature is increased to warm up the vehicle component.

In an aspect, when a condition that the tire slip rate exceeds a preset critical slip rate is satisfied as the preparation mode entry condition, warming up the vehicle component comprises increasing brake hydraulic pressure of the brake device to increase tire friction, thereby warming up the vehicle component.

In an aspect, the method may further include determining, by the controller, whether the current vehicle driving state satisfies a preset preparation mode release condition based on the vehicle state information and the tire slip rate, and terminating, by the controller, warm-up of the vehicle component and releasing the preparation mode when the preparation mode release condition is satisfied.

In an aspect, the vehicle is an internal combustion engine vehicle, and the preparation mode release condition may include a first condition that the engine temperature is greater than or equal to a preset critical engine temperature, a second condition that the transmission temperature is greater than or equal to a preset critical transmission temperature, and a third condition that the tire slip rate is less than or equal to a preset critical slip rate. Determining whether the current vehicle driving condition satisfies the preset preparation mode release condition may include determining that the current vehicle driving condition satisfies the preset preparation mode release condition when the first condition, the second condition and the third condition are satisfied.

In an aspect, the vehicle is an electrified vehicle, and the preparation mode release condition may include a first condition that the battery temperature is greater than or equal to a preset critical battery temperature, a second condition that the motor temperature is greater than or equal to a preset critical motor temperature, and a third condition that the tire slip rate is less than or equal to a preset critical slip rate. Determining whether the current condition satisfies the preset preparation mode release condition comprises determining that the current condition satisfies the preset preparation mode release condition when the first condition, the second condition, and the third condition are satisfied.

Other aspects and embodiments of the present disclosure are discussed infra.

The above and other features of the disclosure are discussed infra.

BRIEF DESCRIPTION OF THE DRAWINGS

The above and other objects, features and advantages of the present disclosure are described in detail below with reference to embodiments thereof illustrated in the accompanying drawings which are given hereinbelow by way of illustration only, and thus are not limitative of the present disclosure, and in which.

It should be understood that the appended drawings are not necessarily to scale, presenting a somewhat simplified representation of various embodiments illustrative of the basic principles of the disclosure. The specific design features of the present disclosure, including, for example, specific dimensions, orientations, locations, and shapes may be determined in part by the particular intended application and use environment.

In the figures, reference numbers refer to the same or equivalent parts of the present disclosure throughout the several figures of the drawing.

DETAILED DESCRIPTION

Hereinafter, embodiments of the present disclosure are described in detail with reference to the accompanying drawings. Specific structural or functional descriptions presented in the embodiments of the present disclosure are only illustrative for the purpose of describing embodiments according to the present disclosure. The embodiments according to the present disclosure may be implemented in various forms. In addition, the present disclosure should not be construed as being limited to the embodiments described herein, and should be understood to include all modifications, equivalents, and substitutes included in the spirit and scope of the present disclosure.

In the present specification, even though terms such as "first," "second," etc. may be used to describe various elements, the elements are not limited by these terms. These terms are only used to distinguish one element from another. For example, within the scope not departing from the scope of the present disclosure, a first element may be referred to as a second element, and similarly, the second element may be referred to as the first element.

When an element is referred to as being "coupled" or "connected" to another element, the element may be directly coupled or connected to the other element, or another element may be present therebetween. In contrast, when an element is referred to as being "directly coupled" or "directly connected" to another element, it should be understood that there are no other elements therebetween. Other expressions for describing a relationship between elements, e.g., expressions such as "between" and "immediately between" or "adjacent to" and "directly adjacent to," should be interpreted similarly.

Like reference numerals refer to like elements throughout. The terminology used herein is for the purpose of describing the embodiments, and is not intended to limit the present disclosure. In the present specification, a singular expression includes the plural form unless the context clearly dictates otherwise. Referring to expressions "comprises" and/or "comprising" used in the specification, a mentioned component, step, operation, and/or element does not exclude the presence or addition of one or more other components, steps, operations, and/or elements.

When a component, device, element, or the like of the present disclosure is described as having a purpose or performing an operation, function, or the like, the component, device, or element should be considered herein as being "configured to" meet that purpose or perform that operation or function.

The present disclosure relates to a method of implementing a preparation mode capable of improving racing performance of a vehicle, and includes a process of warming up vehicle components.

In embodiments of the present disclosure, the preparation mode is a mode performed before circuit racing for the purpose of improving circuit driving performance of a vehicle. In an embodiment, the preparation mode may be a mode for improving circuit driving performance of a vehicle by warming up a vehicle component, such as a vehicle-mounted part or device related to vehicle driving performance before racing.

In embodiments of the present disclosure, the vehicle-mounted part or device is a part or device that determines driving performance of the vehicle, which may be at least one of a part and device included in a powertrain of the vehicle, a power electronic (PE) part, or a tire.

For example, in an embodiment of the present disclosure, a part or device to be managed (warmed up) in the preparation mode including a warmup process before racing may be at least one of an engine or a transmission included in the powertrain in the case of an internal combustion engine vehicle, and may be at least one of a motor, which is a powertrain part and a PE part, and a battery, which is a PE part, in the case of an electrified vehicle.

In embodiments, the electrified vehicle is a vehicle driven by a motor. The electrified vehicle may be a hybrid vehicle or a battery electric vehicle that is a pure electric vehicle. The motor is a drive motor for driving the vehicle, and the battery is a typical high-voltage battery that supplies operating power to the drive motor in the electrified vehicle.

In addition, in some embodiments of the present disclosure, a tire may be a vehicle component that determines circuit driving performance of the vehicle and may be a part to be managed in the preparation mode, in addition to the part and device included in the powertrain and the PE part.

Figure 1:
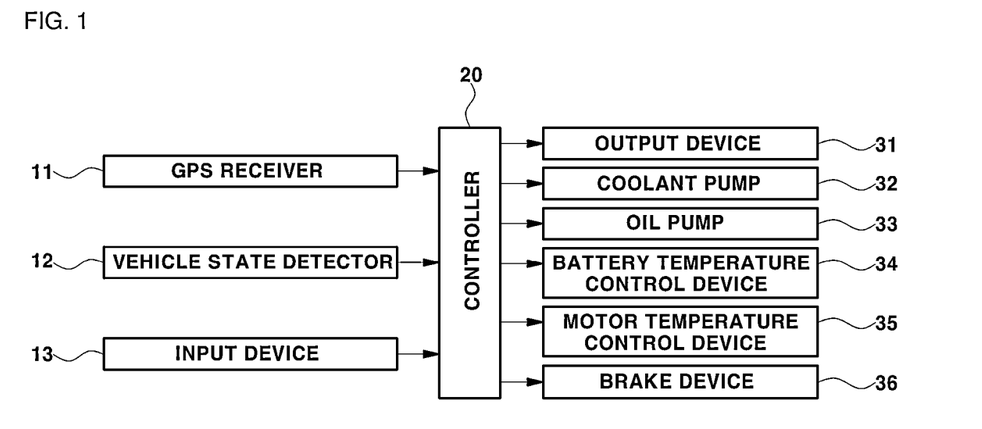
FIG. 1 is a block diagram illustrating a configuration of an apparatus for implementing a preparation mode of a vehicle, according to an embodiment of the present disclosure.
Figure 2:
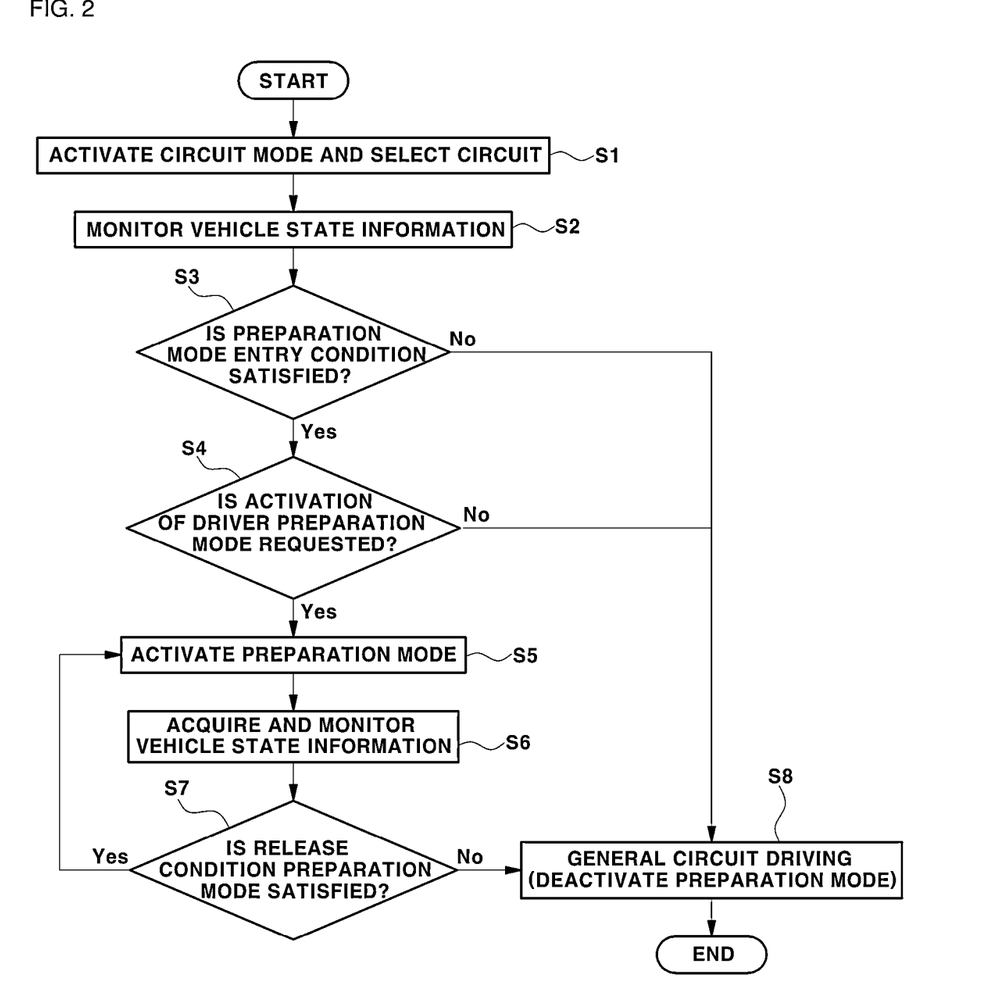
FIG. 2 is a flowchart illustrating a method of implementing the preparation mode, according to an embodiment of the present disclosure.

FIG. 1 is a block diagram illustrating a configuration of an apparatus for implementing a preparation mode of a vehicle, according to an embodiment of the present disclosure. FIG. 2 is a flowchart illustrating a method of implementing a preparation mode, according to an embodiment of the present disclosure.

As illustrated in FIG. 1, the apparatus for implementing the preparation mode according to an embodiment of the present disclosure is mounted on a vehicle and includes a GPS receiver 11, a vehicle state detector 12, an input device 13, a controller 20, an output device 31, and warm-up devices 32 to 36.

Among the above components, the GPS receiver 11 is provided to receive a GPS signal indicating a current vehicle location from outside the vehicle. In addition, the GPS receiver 11 is provided to input a GPS signal received as a signal related to the vehicle location to the controller 20.

As a result, the controller 20 may determine the current vehicle location from the GPS signal, which is a signal related to the vehicle location received and input through the GPS receiver 11.

The vehicle state detector 12 is a component that detects information indicating a real-time driving state of the vehicle and a state of a vehicle component, i.e., vehicle state information. The real-time driving state information of the vehicle may include a wheel speed of each wheel and a vehicle speed.

In various embodiments, as described above, the vehicle component is a device or part that determines driving performance of the vehicle during racing, and is a part to be managed in the preparation mode, for example to be warmed up in the preparation mode according to the present disclosure.

The vehicle component may be at least one of a part and device of the powertrain, a PE part, or a tire of the vehicle. For example, the vehicle component may include at least one of an engine or a transmission in the case of an internal combustion engine vehicle. As another example, the vehicle component may include at least one of a motor or a battery in the case of an electrified vehicle.

In an embodiment, the vehicle state detector 12 may include a sensor that detects a temperature of a vehicle component as state information of the vehicle component. In various embodiments, the state information of the vehicle component may include at least one of an engine temperature, a transmission temperature, a motor temperature, or a battery temperature, or a combination thereof. Among these temperatures, the engine temperature may be a temperature of coolant passing through the engine, and the transmission temperature may be a transmission fluid temperature.

In various embodiments, the vehicle state detector 12 may include at least one of a coolant temperature sensor for detecting a coolant temperature, an oil temperature sensor for detecting a transmission fluid temperature, a motor temperature sensor for detecting a motor temperature, or a battery temperature sensor for detecting a battery temperature, or a combination thereof.

The input device 13 is configured to enable driver operation and to output an electrical signal according to driver operation. In an embodiment, the input device 13 and the controller 20 are connected to each other so that an electrical signal output from the input device 13 may be input to the controller 20.

In an embodiment, the input device 13 may be used by the driver to activate a circuit mode and the preparation mode. When the driver operates the input device 13 to activate the circuit mode or the preparation mode, an electrical signal according to the driver operation is input from the input device 13 to the controller 20.

Accordingly, the controller 20 may receive an electrical signal from the input device 13 and may recognize a circuit mode activation request state or a preparation mode activation request state by the driver. The controller 20 may then activate the circuit mode or preparation mode.

In some embodiments, an input device for requesting activation of the circuit mode and an input device for requesting activation of a driving mode may be separately provided input devices. Alternatively, the input devices may not be separate input devices, and may be one operating element in which a circuit mode activation request function and a driving mode activation request function may be integrated with each other.

In addition, in some embodiments, a separate input device for activating the circuit mode may be omitted, or the circuit mode activation request function by the driver may not be included the input device. In an embodiment, when the controller 20 confirms that the vehicle has entered the circuit from the current vehicle location, the controller 20 may activate the circuit mode without a user activation request.

For example, the controller 20 may acquire vehicle location information in real time based on the GPS signal received through the GPS receiver 11. Upon determining that the vehicle has entered a circuit selected by the driver through an input device for circuit selection based on current vehicle location information as described in more detail below, the controller 20 may activate the circuit mode without a user activation request.

In an embodiment, the input device 13 may further include an input device used by the driver to input various types of information necessary for performing the preparation mode, in addition to an input device for mode activation used by the driver to request activation of the circuit mode or the preparation mode.

For example, the input device 13 may further include an input device operated by the driver to select and input a circuit to be used. In various embodiments, the input device for mode activation and the input device for circuit selection may be separate input devices, or may be one operating element having integrated functions rather than separate input devices.

The input device for circuit selection may be connected to the controller 20 so that an electrical signal according to driver operation may be input. When the driver selects a circuit through the input device for circuit selection, the controller 20 may recognize the circuit selected by the driver.

In various embodiments of the present disclosure, various types and forms of input devices may be adopted and used as the input device 13 without particular limitation. the various input devices may allow driver operation and may be provided in vehicles so that output of an electrical signal and input of an output electrical signal to the controller according to driver operation are provided.

For example, the input device for requesting activation of the preparation mode may be a button, a switch, a dial, a knob, a touchscreen, etc. connected to the controller 20. As another example, the into device for requesting activation of the preparation mode may be an input device of an AVN (Audio, Video & Navigation) system.

In an embodiment, the output device 31 may be a display device or a sound output device provided in the vehicle. Operation of the output device 31 may be controlled according to a control signal output by the controller 20. The output device 31 may output and provide various types of information generated while the preparation mode is performed to the driver.

In addition, the output device 31 may be configured to output various types of information generated before entering the preparation mode or after releasing the preparation mode and during general circuit driving after releasing the preparation mode. In an embodiment, the general circuit driving may refer to driving in a circuit of the vehicle including racing, not circuit driving in the preparation mode.

The output device 31 may be a display device of the AVN system, or may be a cluster or a head-up display (HUD).

In an embodiment, warm-up devices may include a coolant pump 32 that circulates engine coolant, an oil pump 33 that circulates transmission fluid, a battery temperature control device 34 capable of increasing a battery temperature, a motor temperature control device 35 capable of increasing a motor temperature, and/or a brake device 36 that brakes the vehicle.

FIG. 1 illustrates warm-up devices capable of warming up the vehicle components in the vehicle. In some embodiments, the illustrated warm-up devices may be selectively used.

For example, in the case of the internal combustion engine vehicle, at least one of the coolant pump 32, the oil pump 33, or the brake device 36 controlled by the controller 20 may be adopted and used as a warm-up device.

On the other hand, in the case of the battery electric vehicle or the hybrid vehicle, which is an electrified vehicle, at least one of the battery temperature control device 34, the motor temperature control device 35, or the brake device 36 controlled by the controller 20 may be adopted and used as a warm-up device.

In an embodiment, the battery temperature control device 34 and the motor temperature control device 35 may be heating devices capable of heating the battery and the motor. In various embodiments, the heating devices may be heating devices that directly heat the battery and the motor, respectively, or may be heating devices that heat coolant passing through the battery and the motor, respectively.

Alternatively, the heating devices may be valve devices that control flows of coolant so that the coolant cooling the battery and the motor bypasses a radiator without passing through the radiator. When a control operation is performed so that the coolant does not pass through the radiator while the vehicle is driven on the circuit, the temperatures of the battery and the motor may be increased.

Operating states of the warm-up devices, according to embodiments of the present disclosure, are described in more detail below in connection with a method of implementing the preparation mode.

FIG. 2 is a block diagram illustrating a method of implementing the preparation mode for circuit driving of the vehicle, according to an embodiment. The method of FIG. 2 includes an operation S1 at which the driver operates the input device 13 to activate the circuit mode. The driver also operates the input device 13 to select a circuit so that course information of the circuit may be utilized.

Accordingly, in the controller 20, the circuit mode is activated, and the circuit selected by the driver may be recognized. In an embodiment, selection of a circuit comprises selecting one circuit to be currently used by the driver from among several circuits operated throughout the country. The driver may select one circuit currently near the vehicle among a plurality of circuits, for example.

In an embodiment, the driver may select a place where the circuit to be used is located and designate the circuit. For example, the driver may select Inje, Yeongam, Taean, etc. as one of places where the circuit is located.

As described above, the circuit mode may be activated by the driver operating the input device 13 (input device for mode activation). However, in another embodiment, upon determining that the vehicle enters the circuit selected by the driver from a GPS signal received through the GPS receiver 11, the controller 20 may activate the circuit mode without a user activation request.

In an operation S2, while the driver drives the vehicle to enter the selected circuit, and the vehicle is driven along the circuit with the circuit mode activated (before entering the preparation mode and before racing), the controller 20 acquires vehicle state information detected by the vehicle state detector 12 in real time.

In various embodiments, the controller 20 acquires at least one of an engine temperature, a transmission temperature, a motor temperature, or a battery temperature as vehicle state information, and acquires current vehicle location information from a GPS signal received through the GPS receiver 11, or a combination thereof.

Figure 3:
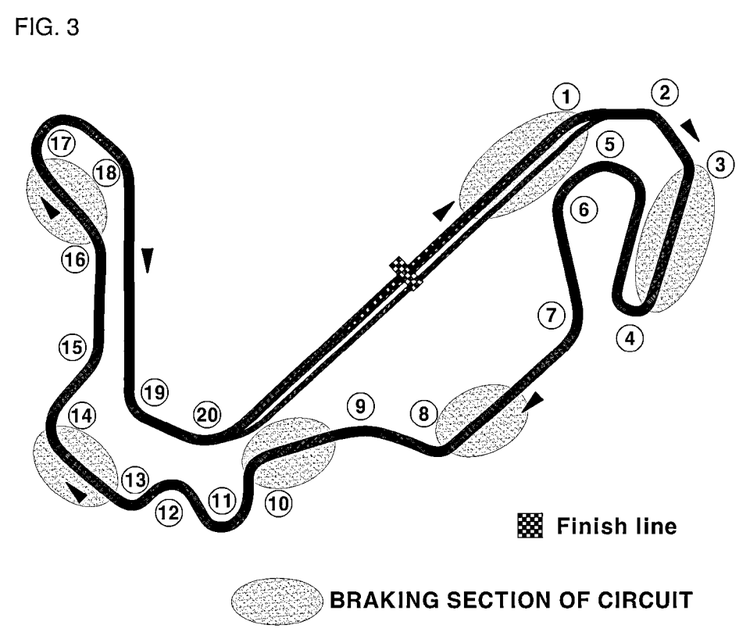
FIG. 3 is a diagram illustrating a braking section set in a circuit, according to an embodiment of the present disclosure.

In an embodiment, the controller 20 verifies whether the vehicle is driven in a predetermined braking section on the circuit based on information on the circuit selected by the driver and the current vehicle location information. When the vehicle is driven in the braking section, the controller 20 may determine a tire slip rate $r_{slip}$ in the braking section from vehicle state information detected by the vehicle state detector 12. FIG. 3 is a diagram illustrating a braking section in a circuit, according to an embodiment of the present disclosure.

In an embodiment, when the vehicle is driven in the predetermined braking section of the circuit, the controller 20 determines the tire slip rate $r_{slip}$ using Equation 1 based on information on a wheel speed of each wheel and a vehicle speed, which is vehicle state information detected through the vehicle state detector 12.

$$r_{slip} = (V - V_{WL})/V \qquad \text{[Equation 1]}$$

In Equation 1, Islip denotes a slip rate, V denotes a vehicle speed, and VWL denotes a wheel speed of each wheel.

At an operation S3, the controller 20 determines whether a current vehicle driving state satisfies a preset preparation mode entry condition based on the vehicle state information and the tire slip rate acquired as described above.

While the vehicle is driven, each vehicle component has an appropriate temperature at which highest performance may be output. The controller 20 may acquire an engine temperature, a transmission temperature, a motor temperature, and a battery temperature as real-time state information of vehicle components in the vehicle state information, and determine whether the preparation mode entry condition is satisfied from the acquired temperature information.

In an embodiment, in the case of a tire, adhesive strength increases when a proper temperature is reached, and faster acceleration and deceleration are possible as the amount of tire slip decreases. As rolling of the vehicle increases, the tire locks and the wheel speed decreases, eventually increasing the tire slip rate.

Accordingly, in embodiments of the present disclosure, a tire slip rate during vehicle braking is calculated to estimate tire adhesive strength, and the calculated tire slip rate is used to determine whether the current vehicle state satisfies the preparation mode entry condition.

In an embodiment, the controller 20 may operate the display device in the output device 31 of the vehicle, for example, the display device of the AVN system, to display the acquired vehicle state information during circuit driving.

Figure 4:
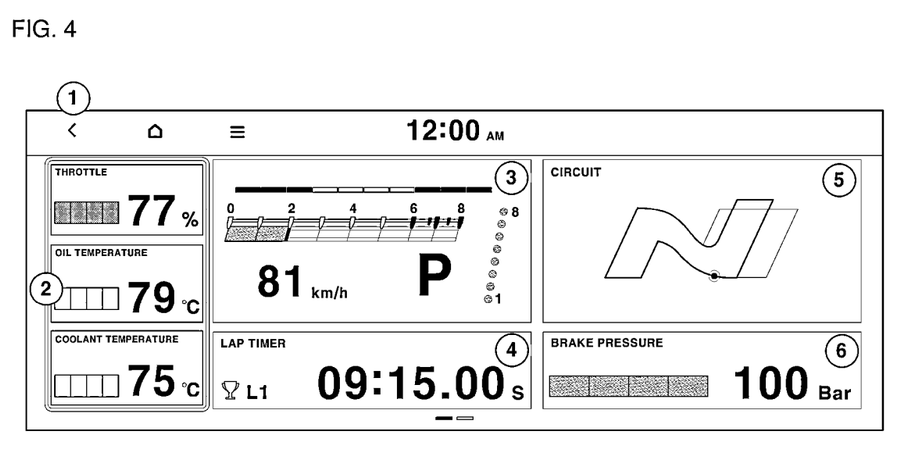
FIG. 4 is a diagram illustrating a state in which vehicle state information is displayed during circuit driving in the preparation mode, according to an embodiment of the present disclosure.

FIG. 4 illustrates a state in which vehicle state information, such as an engine coolant temperature as an engine temperature and a transmission fluid temperature as a transmission temperature, is displayed during circuit driving in the preparation mode through the display device, according to an embodiment of the present disclosure. FIG. 4 illustrates an example in which the vehicle state information is displayed in the internal combustion engine vehicle.

In an embodiment, the preparation mode entry condition may include a condition in which a temperature of a vehicle component is less than a predetermined critical temperature and a condition in which a tire slip rate exceeds a predetermined critical slip rate.

In an embodiment, the controller 20 may determine that the preparation mode entry condition is satisfied when the temperature of the vehicle component is less than the predetermined critical temperature or the tire slip rate exceeds the critical slip rate.

For example, in the case of the internal combustion engine vehicle, the preparation mode entry condition may include at least one of a condition that the engine temperature is less than a preset critical engine temperature (for example, 90° C.), a condition that the transmission temperature is less than a preset critical transmission temperature (for example, 90° C.), or a condition that the tire slip rate $r_{slip}$ exceeds a preset critical slip rate (for example, 80%), or a combination thereof.

In an embodiment, the controller 20 determines that the preparation mode entry condition is satisfied when the at least one condition is satisfied.

As another example, in the case of the electrified vehicle, the preparation mode entry condition may include at least one of a condition that the battery temperature is less than a preset critical battery temperature (20° C.), a condition that the motor temperature is less than a preset critical motor temperature (50° C.), or a condition that the tire slip rate Islip exceeds a preset critical slip rate (80%), or a combination thereof.

In the case of the electrified vehicle, the controller 20 may determine that the preparation mode entry condition is satisfied when one of the above conditions is satisfied.

In an embodiment, upon determining that the current vehicle driving state satisfies the preparation mode entry condition, the controller 20 notifies the driver that the preparation mode may be entered by outputting an indication thereof through the output device 31. Referring again to FIG. 2, in an operation S4, the driver may request activation of the preparation mode by operating the input device 13.

In an operation S5, upon receiving a request for activation of the preparation mode from the driver through the input device 13, the controller 20 activates the preparation mode. The output device 31 may be operated to notify the driver that the preparation mode is activated. For example, the controller 20 may notify the driver by operating the display device of the AVN system or the cluster to indicate that the preparation mode is activated.

In an embodiment, when the preparation mode is activated, the controller 20 operates the warm-up devices 32 to 36 while the vehicle is driven on the circuit to warm up the vehicle components so that the vehicle may reach the maximum performance. In this way, the performance of the vehicle is rapidly increased within a limited circuit use time.

In an embodiment, when the vehicle to which the present disclosure is applied is the internal combustion engine vehicle, and the engine temperature is less than the critical engine temperature in a preparation mode entry condition determination step, the controller 20 performs a control operation to decrease an operating rate or an operating speed of the coolant pump 32 to a preset value. In this way, the engine temperature is increased by reducing the rate of circulation of engine coolant.

In an embodiment, when the transmission temperature is less than the critical transmission temperature in the preparation mode entry condition determination step, the controller 20 performs a control operation to decrease an operating rate or an operating speed of the oil pump 33 to a preset value. In this way, the transmission temperature is increased by reducing the rate of circulation of transmission fluid.

In an embodiment, when the tire slip rate exceeds the critical slip rate, tire friction is increased by controlling an operation of the brake device 36 so that brake hydraulic pressure is increased to a preset value.

When the engine temperature is less than the critical engine temperature, and the transmission temperature is less than the critical transmission temperature, warm-up control for raising the engine temperature and the transmission temperature may be simultaneously performed. When the tire slip rate exceeds the critical slip rate at the same time, warm-up control for increasing the brake hydraulic pressure may be performed.

In an embodiment, when the vehicle to which the present disclosure is applied is the electrified vehicle, and the battery temperature is less than the critical battery temperature when determining the preparation mode entry condition, the controller 20 performs warm-up control to increase the battery temperature, and at this time, the battery temperature control device 34 may be operated to increase the battery temperature.

In an embodiment, when the motor temperature is less than the critical motor temperature when determining the preparation mode entry condition, the controller 20 performs warm-up control to increase the motor temperature, and at this time, the motor temperature control device 35 may be operated to increase the motor temperature.

In an embodiment, when the tire slip rate exceeds the critical slip rate, tire friction is increased by controlling an operation of the brake device 36 so that brake hydraulic pressure is increased.

In an embodiment, when the battery temperature is less than the critical battery temperature, and the motor temperature is also less than the critical motor temperature, warm-up control for increasing the battery temperature and the motor temperature may be simultaneously performed. When the tire slip rate exceeds the critical slip rate at the same time, warm-up control for increasing the brake hydraulic pressure may be performed.

In an operation S6, while the preparation mode is performed as described above, the controller 20 acquires vehicle state information and a tire slip rate in real time. In an operation S7, the controller 20 determines whether a current vehicle driving state satisfies a preparation mode release condition based on the acquired vehicle state information and tire slip rate.

In an operation S8, upon determining that the preparation mode release condition is satisfied, the controller 20 terminates warm-up of the vehicle components, releases and deactivates the preparation mode, and then performs normal and general circuit driving control.

In an embodiment, when the preparation mode is released, the output device 31 is operated to notify the driver that the preparation mode is released. For example, the controller 20 may notify the driver that the preparation mode is released by operating the display device of the AVN system or the cluster.

In an embodiment, the preparation mode release condition may include a condition that a temperature of a vehicle component is equal to or greater than a predetermined critical temperature, and a condition that a tire slip rate is less than a predetermined critical slip rate.

In an embodiment, when the temperature of the vehicle component is less than the predetermined critical temperature, and the tire slip rate exceeds the critical slip rate at the same time, the controller 20 may determine that the preparation mode release condition is satisfied.

For example, in the case of the internal combustion engine vehicle, the preparation mode release condition may include a condition that the engine temperature is greater than or equal to a preset critical engine temperature (for example, 90° C.), a condition that the transmission temperature is greater than or equal to a preset critical transmission temperature (for example, 90° C.), and a condition that the tire slip rate Islip is less than or equal to a preset critical slip rate (for example, 80%), or a combination thereof.

In an embodiment, the controller 20 determines that the preparation mode release condition is satisfied when all of the above conditions are satisfied.

As another example, in the case of the electrified vehicle, the preparation mode release condition may include a condition that the battery temperature is greater than or equal to a preset critical battery temperature (20° C.), a condition that the motor temperature is greater than or equal to a preset critical motor temperature (50° C.), or a condition that the tire slip rate Islip is less than or equal to a preset critical slip rate (80%), or a combination thereof.

In the case of the electrified vehicle, the controller 20 may determine that the preparation mode release condition is satisfied when all of the above conditions are satisfied.

Thus, according to an embodiment of the method of implementing the circuit preparation mode of the vehicle, there is an effect that it is possible to improve driving performance of the vehicle during racing by warming up the vehicle component (vehicle-mounted part or device) before racing.

While embodiments of the present disclosure have been described in detail above, the scope of the present disclosure is not limited thereto, and various modifications and improvements by those having ordinary skill in the art may be made without departing from the scope of the present disclosure defined in the following claims.

What is claimed is:

1. A method of implementing a preparation mode for circuit driving of a vehicle,
the method comprising:
acquiring, by a controller, vehicle state information detected by a vehicle state detector while the vehicle is driven on a circuit before racing after entering the circuit, and determining a tire slip rate from a wheel speed and a vehicle speed in the vehicle state information;
determining, by the controller, whether a current vehicle driving state satisfies a preset preparation mode entry condition based on the vehicle state information and the tire slip rate; and
when the current vehicle driving state satisfies the preset preparation mode entry condition, controlling, by the controller, an operation of a warm-up device for warming up a vehicle component that determines driving performance of the vehicle, and warming up the vehicle component.

2. The method of claim 1, further comprising acquiring, by the controller, current vehicle location information from a GPS signal received by a GPS receiver,
wherein determining the tire slip rate comprises verifying, by the controller, whether the vehicle is driven in a determined braking section on the circuit based on information about the circuit selected by a driver and the current vehicle location information, and determining a tire slip rate in the determined braking section on the circuit.

3. The method of claim 1, wherein:
the vehicle is an internal combustion engine vehicle, and
determining whether the current vehicle driving state satisfies the preset preparation mode entry condition comprises using one or both of an engine temperature or a transmission temperature as the vehicle state information.

4. The method of claim 3, wherein:
the preset preparation mode entry condition comprises at least one of:
a first condition that the engine temperature is less than a preset critical engine temperature,
a second condition that the transmission temperature is less than a preset critical transmission temperature, or
a third condition that the tire slip rate exceeds a preset critical slip rate, and
determining whether the current vehicle driving state satisfies the preset preparation mode entry condition comprises determining that the current vehicle driving state satisfies the preset preparation mode entry condition when the at least one of the first condition, the second condition, or the third condition is satisfied.

5. The method of claim 1, wherein:
the vehicle is an internal combustion engine vehicle,
the vehicle component includes at least one of an engine, a transmission, or a tire, and
the warm-up device includes at least one of a coolant pump configured to circulate engine coolant, an oil pump configured to circulate transmission fluid, or a brake device configured to brake the vehicle.

6. The method of claim 5, wherein, when a condition that an engine temperature is less than a preset critical engine temperature is satisfied as the preset preparation mode entry condition, warming up the vehicle component comprises decreasing, by the controller, an operating rate or an operating speed of the coolant pump.

7. The method of claim 5, wherein, when a condition that a transmission temperature is less than a preset critical transmission temperature is satisfied as the preset preparation mode entry condition, warming up the vehicle component comprises decreasing, by the controller, an operating rate or an operating speed of the oil pump.

8. The method of claim 5, wherein, when a condition that the tire slip rate exceeds a preset critical slip rate is satisfied as the preset preparation mode entry condition, warming up the vehicle component comprises increasing, by the controller, brake hydraulic pressure of the brake device to increase tire friction, thereby warming up the vehicle component.

9. The method of claim 1, wherein
the vehicle is an electrified vehicle,
determining whether the preset preparation mode entry condition is satisfied includes using at least one of a battery temperature or a motor temperature as the vehicle state information.

10. The method of claim 9, wherein:
the preset preparation mode entry condition comprises at least one of:
a first condition that the battery temperature is less than a preset critical battery temperature,
a second condition that the motor temperature is less than a preset critical motor temperature, or
a third condition that the tire slip rate exceeds a preset critical slip rate, and
determining whether the current vehicle driving state satisfies the preset preparation mode entry condition comprises determining that the current vehicle driving state satisfies the preset preparation mode entry condition when at least one of the first condition, the second condition, or the third condition is satisfied.

11. The method of claim 1, wherein:

the vehicle is an electrified vehicle, the vehicle component includes at least one of a motor for driving the vehicle, a battery for supplying power to the motor, or a tire, and the warm-up device includes at least one of a motor temperature control device capable of increasing a motor temperature, a battery temperature control device capable of increasing a battery temperature, or a brake device for braking the vehicle.

12. The method of claim 11, wherein, when a condition that the motor temperature is less than a preset critical motor temperature is satisfied as the preset preparation mode entry condition, warming up the vehicle component comprises controlling, by the controller, an operation of the motor temperature control device so that the motor temperature is increased.

13. The method of claim 11, wherein, when a condition that the battery temperature is less than a preset critical battery temperature is satisfied as the preset preparation mode entry condition, warming up the vehicle component comprises controlling, by the controller, an operation of the battery temperature control device so that the battery temperature is increased.

14. The method of claim 11, wherein, when a condition that the tire slip rate exceeds a preset critical slip rate is satisfied as the preset preparation mode entry condition, warming up the vehicle component comprises increasing, by the controller, brake hydraulic pressure of the brake device to increase tire friction.

15. The method of claim 1, further comprising:

determining, by the controller, whether the current vehicle driving state satisfies a preset preparation mode release condition based on the vehicle state information and the tire slip rate; and terminating, by the controller, warm-up of the vehicle component and releasing the preparation mode when the current vehicle driving state satisfies the preset preparation mode release condition.

16. The method of claim 15, wherein:

the vehicle is an internal combustion engine vehicle, the preset preparation mode release condition comprises:

a first condition that an engine temperature is greater than or equal to a preset critical engine temperature, a second condition that a transmission temperature is greater than or equal to a preset critical transmission temperature, and a third condition that the tire slip rate is less than or equal to a preset critical slip rate, and determining whether the current vehicle driving condition satisfies the preset preparation mode release condition includes determining that the current vehicle driving condition satisfies the preset preparation mode release condition when the first condition, the second condition and the third condition are satisfied.

17. The method of claim 15, wherein:

the vehicle is an electrified vehicle, the preset preparation mode release condition comprises:

a first condition that the battery temperature is greater than or equal to a preset critical battery temperature, a second condition that the motor temperature is greater than or equal to a preset critical motor temperature, and a third condition that the tire slip rate is less than or equal to a preset critical slip rate, and determining whether the current condition satisfies the preset preparation mode release condition comprises determining that the current condition satisfies the preset preparation mode release condition when the first condition, the second condition, and the third condition are satisfied.

* * * * *